W. WRIGHT.
COMBINED TYPE WRITING AND COMPUTING MACHINE.
APPLICATION FILED DEC. 1, 1911.
1,246,009.
Patented Nov. 6, 1917.
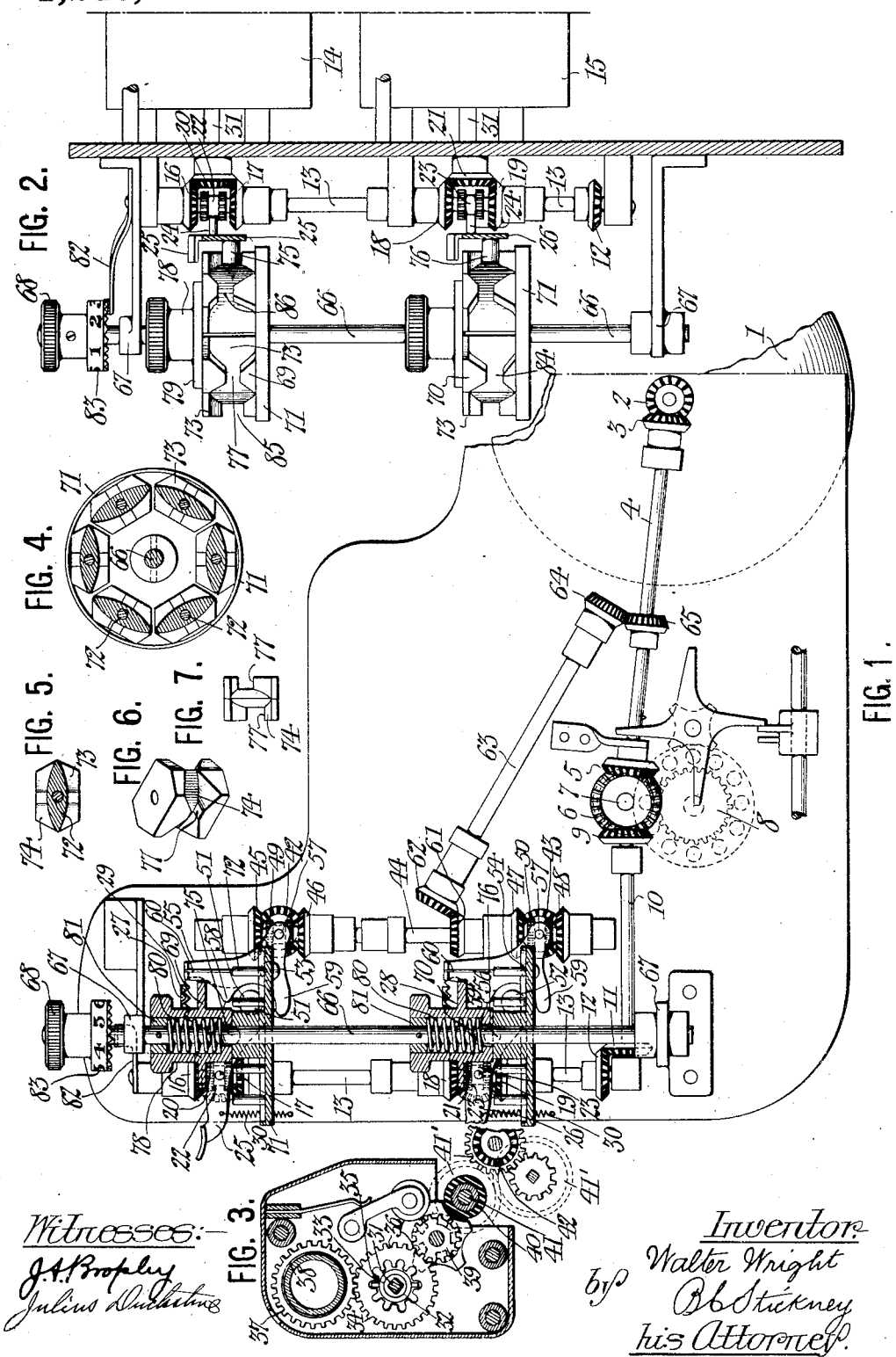

UNITED STATES PATENT OFFICE.

WALTER WRIGHT, OF NEW YORK, N. Y., ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,246,009.  Specification of Letters Patent.  Patented Nov. 6, 1917.

Application filed December 1, 1911. Serial No. 663,215.

*To all whom it may concern:*

Be it known that I, WALTER WRIGHT, a citizen of the United States, residing in New York city, in the county of New York and State of New York, have invented certain new and useful Improvements in Combined Type-Writing and Computing Machines, of which the following is a specification.

This invention relates to a semi-automatic control for computing heads of a type useful in connection with Underwood-Wright combined typewriting and computing machines, and is an improvement on an application No. 543,603, filed February 12, 1910, jointly by Gustave O. Degener and myself, and my application No. 569,502, filed June 29, 1910.

In certain types of combined typewriting and computing work, it is desired to repeat a predetermined sequence of operations over and over again. For example, it may be desired to keep a bank account, wherein the date is written out, the balance of the day before carried forward, the amount deposited added to this balance, to give the cash on hand, and the total of all the checks drawn against this cash on hand summed up and deducted from the cash on hand, so as to give the balance to be carried forward to the next day.

Now if the above computation were carried on, and assuming each day occupied a line, it would be necessary to repeatedly shift one or more computing heads to their several states of adding, neutral and subtracting a number of times each line, according to the sequence of the various portions of the computation carried on.

Where a number of computing heads are used, and frequent changes in each computing head required during a single line, as in the above problem, the operation becomes tedious, and also is open to the danger of having mistakes made by a wrong shift of one of the computing heads.

It is therefore an object of this invention to provide a semi-automatic control for one or more of the computing heads, which will change the state of the computing heads, according to a predetermined sequence of operations, by a simple manual operation of the governing mechanism a step each time it is desired to bring the computing head to another change in state.

In the embodiment with which this invention is illustrated, a computing machine of the Underwood-Wright type is used, in which the master wheel of each computing head is driven a predetermined amount from a source of power, which amount is controlled by an escapement mechanism, and depends on the particular numeral key actuated. The master wheel of each head is connected to the source of power by means of a gearing, which includes a clutching mechanism capable of reversing, so as to drive in either direction, and also capable of occupying a neutral position wherein the master wheel will not be driven at all. Tens-carrying mechanism for each computing head is also driven from the source of power, and also has a controlling mechanism shiftable so as to drive in both directions, and also so as not to drive at all. The controlling mechanism of each master wheel and the tens-carrying mechanism are operable by the movement of a composite shifting lever.

To obtain the automatic shift of all of the computing heads so that a certain sequence of operations for the computing heads may be obtained, there is provided a governing mechanism, which includes a rotatable shaft having mounted thereon, in connection with the controlling mechanism of each computing head, a shifter, which in this instance is shown to embody a plurality of locators of a character such that they will determine the position of the controlling mechanism for each computing head, and thus the state of each computing head. In this instance, the shifters are shown in the form of holders mounted on the shaft and having the locators adjustably and reversibly connected thereto, so as to enable the differently formed sides thereof to be brought in play at the same point and at different points, so as to vary the sequence of changes brought about by the governing mechanism.

The locators are shown to be provided with positioning points which determine the position of each controlling mechanism, and have inclined surfaces extending thereto so as to form guides which bring the coöperating part of the controlling mechanism, shown in this instance to be a pin, to the positioning point.

Other features and advantages will hereinafter appear.

In the accompanying drawings,

Figure 1 is a fragmentary view in side elevation with parts in section and with parts removed to show the underlying structure.

Fig. 2 is a fragmentary vertical section.

Fig. 3 is an enlarged vertical section through one of the computing heads.

Fig. 4 is a horizontal section through one of the shifters, showing the relative arrangement of the locators and the formation of both sides thereof.

Figs. 5, 6 and 7 are detail views of one of the locators, showing the peculiar structure thereof.

Referring more particularly to the separate parts of this invention as embodied in the form shown in the drawings, 1 indicates a motor which drives through a slip clutch (not shown) a bevel gear 2 meshing with a gear 3 on a shaft 4. The shaft 4 is provided with a bevel gear 5 meshing with a controlling bevel gear 6, which is mounted on a shaft 7, the rotation of which is prevented by an escapement mechanism 8 controlled by the numeral keys (not shown) in such a manner as to permit a rotation of the shaft 7, at the actuation of a numeral key, an extent proportionate to the particular numeral key struck, the slip clutch (not shown) permitting the rotation of the motor without actuating the other mechanism. This structure is more fully described in the prior application No. 543,603, above mentioned.

The bevel gear 6 has also meshing therewith a bevel gear 9, which is mounted on a shaft 10, so as to rotate a bevel gear 11 at its other end, which meshes with a bevel gear 12 on a vertical shaft 13. The shaft 13 is provided with a plurality of pairs of bevel gears, one pair for each of the computing heads 14 and 15. These gears are indicated by the numerals 16 and 17, and 18 and 19. The members of each pair are faced in opposite directions, and both of them mesh with gears 20 and 21, so as to be capable, when they are rotated, of driving these gears 20 and 21 each in opposite directions.

The gears 16 to 19, however, are loosely mounted on the shaft 13, but capable of being connected thereto by means of shift clutches 22 and 23, which have teeth on each end capable of engaging with corresponding teeth provided in the inwardly facing sides of the gears 16 to 19, so as to connect either one of each pair in driven relation with the shaft 13. These clutches can also assume an intermediate neutral position in which neither of the members of each pair of gears is connected in driving relation to the shaft 13. Each of the clutches 22 and 23 is provided with a groove into which pins 24 on shifting levers 25 and 26 enter. These shifting levers project from the front of the machine, so that they can be manipulated to control the position of each clutch. For the purpose of holding each of these levers in any adjusted position, there are provided spring latches 27 and 28, which engage in one of three notches 29 provided on an extension of each of the levers 25 and 26. Springs 30 tend to draw the shift levers 25 and 26 to their lowermost position corresponding to adding.

It will thus be seen that the direction of rotation of the gears 20 and 21 can be controlled separately very easily. These gears are secured to master wheel shafts 31, which, as will be seen by reference to Fig. 7, are squared, so as to permit arbors 32 to be splined thereon, whereby the shafts may be caused to rotate the master wheels 33 secured to these arbors, and yet permit the master wheels to be advanced step by step through a series of computing wheels 34, so as to bring them successively in engagement with the internal gears formed by the inwardly projecting teeth 35 provided on these computing wheels. The computing wheels 34 are also provided with external teeth forming external gears 36 which mesh with gears 37 carrying dial wheels 38 adapted to exhibit the result of the computation carried on by the computing head. This mechanism is shown more clearly and described more fully in the prior application No. 543,603 above referred to.

In addition to driving the master wheels, the shaft 4 also drives in each computing head the tens-carrying mechanism, indicated at 39. This mechanism is described in said application No. 543,603, and depends for its actuation on the rotation and direction of rotation of a rubber roller 40 secured to a shaft 41, there being of course one of these rubber rollers provided in the case of each computing head. The shafts 41 are driven, through the intermediary of trains of gears indicated generally at 41', by bevel gears 42 and 43 similar to those of the master wheel driving shafts. These bevel gears 42 and 43 mesh with pairs of oppositely disposed bevel gears, which are loosely mounted on a shaft 44, so that when any one of these bevel gears is connected to the shaft 44, it will drive one of the bevel gears 42 or 43 in a direction corresponding to the way in which it faces. The members of the pairs of bevel gears are indicated by the numerals 45, 46, 47 and 48.

To control the connection of the members of the pairs of gears to the shaft 44, there are provided clutches 49 and 50, splined on the shaft 44 and having teeth at their tops and bottoms, to engage corresponding teeth in the inner sides of the bevel gears. The clutches 49 and 50 are so connected that they can be operated concomitantly with the operation of the clutches 22 and 23, so as to cause a simultaneous action of the tens-carrying mechanism with the master wheel mechanism, and for the purpose of accomplishing the same character of computation. To this end the shift levers 25 and 26, which are pivoted at 51 and 52, have secured thereto pivot pins 53 and 54, on which are mounted supplementary shifting levers 55 and 56. These supplementary shifting levers 55 and 56 have pins 57, which engage in grooves in the clutches 49 and 50, so as to form a positive connection which will permit a rotation of the clutches. A limited motion between the supplementary shifting levers 55 and 56 and the main shifting levers 25 and 26 is provided by the supplementary levers being pivotally mounted on the main levers, and having fingers 58 and 59 extending on opposite sides of the pivots 51, at a certain distance, to permit a certain amount of play before positive connecting contact therewith. The play between the main and supplementary shifting levers is taken up by springs 60 secured to the pins 53 and 54 and to the supplementary levers 55 and 56. The shaft 44 obtains its drive from the shaft 4 by being provided with a bevel gear 61 meshing with a gear 62 on a shaft 63, which has a bevel gear 64 meshing with a gear 65 on the shaft 4.

We now come to the mechanism which is used to obtain a predetermined sequence of operations by the computing heads in a semi-automatic manner. Arranged in juxtaposition to the shifting levers 25 and 26, there is provided a governing shaft 66, which forms a part of the governing mechanism, whereby the state of the computing heads is controlled through the manipulation of the shifting levers 25 and 26. This shaft 66 is mounted to rotate in bearings 67 on the frame of the machine. Rotation of the shaft may be accomplished by the operator manipulating a knurled button 68 located at the top of the shaft in a convenient position.

Mounted on the shaft 66 in juxtaposition to each of the computing heads, there are provided double acting shifters 69 and 70, which are adapted to shift the levers 25 and 26 from one position to another, or so as to control the state of the corresponding computing heads. These shifters 69 and 70 are shown to include holders 71 having a plurality of pins 72 projecting from one side thereof and located in spaced relation from each other, so as to accommodate locators 73 which are adjustably and detachably connected thereto, whereby their active position may be reversed, and further whereby they may be interchanged with each other. As will be seen by reference to Figs. 4 to 7, each of these locators is provided with grooves 74, which are of such a form that they will engage and determine the position of pins 75 and 76 located on the levers 25 and 26 respectively. The grooves 74 are provided intermediate their ends with horizontal portions 77 which may be termed the "positioning points," in that when the governing mechanism comes to rest, one of the pins 75 or 76 will be located therein when a particular locator is in opposition to one of the levers 25 or 26.

The top and bottom sides of the grooves 74 converge toward the top and bottom sides of the positioning points 77, so as to form guides bringing the pins 75 and 76 to this point in each locator.

It will be noted more especially by reference to Figs. 5 and 7, that each of the locators is provided with one of the grooves 74 on each side, and that the positioning points of these grooves are preferably located at different distances from the top and bottom of the locator to correspond with different positions of the pins 75 and 76, and thus with different states of the computing head. It will thus be seen that a single locator can be made to determine either one of two states for a computing head by merely reversing its position on the holder 71. Inasmuch as the guiding surfaces of the positioning point extend from both ends of each locator and at the top and bottom of the groove 74, the position of the pins 75 and 76 will be positively determined. In other words, the locators are double acting and shift the pins 75 and 76 and thus the shifting levers 25 and 26 both upwardly and downwardly. To hold the locators in any adjusted position on the holders 71, there is provided, in the case of each shifter, a guard 78, which is shown in the form of a collar slidingly mounted on the shaft 66 and having a flange 79 normally pressed into engagement with the tops of the locators 73 by means of a spring 80, which is located within the collar and abuts against a fixed collar 81 on the shaft 66. To lock the shaft 66, and thus the governing mechanism, in any particular step of its adjustment corresponding to the register of one of the positioning points 77 with the pins 75 and 76, there is provided a spring detent 82 which engages a serrated collar 83 mounted on the shaft 66.

The particular step in which the governing mechanism happens to be at any instant may be designated by an indicator, which consists in a series of numbers imprinted on the collar 83 and corresponding in their location to the locators 73.

The operation of the device will be readily understood when taken in connection with the above description. The locators having the proper formation to obtain the desired results, are placed in proper sequence on the holders 71, so as to obtain a predetermined sequence of work by the computing heads. That is to say, if it is desired to have a computing head add at a particular point, a locator is provided on the holder 71 which will come in coöperation with the shifting lever at this instant, which has a formation corresponding to that shown at 84 in Fig. 2, when the pin 76 will be forced to its lowest point of movement corresponding to the adding state of the computing head 15. If it is desired to have the computing head neutral at a particular point, a locator, such as indicated at 85 in Fig. 2, is provided wherein the positioning point 77 is located at equal distances from the top and bottom of the locator. If subtracting is desired by a particular computing head at a particular point, the locator corresponding to that point will have a form such as that indicated at 86 in Fig. 2, wherein the positioning point is situated near the top of the locator and will thus force the corresponding shifting lever to its uppermost or subtracting position.

The governing mechanism is actuated by rotating the shaft 66 each time it is desired to change the state of one or more of the computing heads. This may occur at each new column of computed matter.

It is to be noted that between the successive positioning points on the successive locators there is provided sufficient room to permit the free play of the controlling mechanism independent of the governing mechanism.

Certain features disclosed herein are broadly claimed in my co-pending application, above referred to, Serial No. 569,502, filed June 29, 1910, and also in my co-pending application, Serial No. 652,153, filed September 30, 1911. Application No. 569,502 shows a power-driven, rotary state controller for conditioning the computing mechanism to add, subtract or remain neutral in a predetermined order, the movement of the state controller being subject to a movement of a typewriter carriage. Application No. 652,153 shows a state controller formed in sections, which state controller may be automatically operated in accordance with the movement of the typewriter carriage. The claims in this case are restricted to features of invention which are not disclosed in either of the above-mentioned co-pending applications.

Variations may be resorted to within the scope of the invention, and portions of the improvements may be used without others.

Having thus described my invention, I claim:

1. The combination with a computing head capable of existing in addition, subtraction or a neutral state, of a revoluble locator having double-acting faces for controlling the state of said computing head, said locator acting positively through the medium of said double-acting faces and on a revolving movement thereof to control the computing head for any state thereof.

2. The combination with a computing head, of a state-controlling mechanism for governing different states of said computing head, said state-controlling mechanism including a revoluble shifter having a plurality of positioning points, said shifter acting to positively control the state of said computing head solely by a revolving movement from one position to another and maintaining said computing head in the state to which it is moved while said shifter remains stationary in its different positions with any positioning point active.

3. The combination with a computing head, of mechanism for governing the state thereof, said mechanism including a locator having one character of formation on one side and a different character of formation on the other side, means for maintaining said locator in position to present either character of formation to actively control the state of said computing head, and means for moving said locator in a single plane to control the state of said head with either character of formation active.

4. The combination with a computing head, of controlling mechanism for governing the state of said computing head, said governing mechanism including a shifter having a movement of rotation only and also having a plurality of double-acting locators, each of said locators having a positioning point and some of said positioning points being located at different distances from the top and bottom of certain locators than in certain others of said locators, said locators being interchangeable, whereby different states of said computing head may be produced during a rotary movement of said shifter.

5. The combination with a computing head, of mechanism for governing the state of said computing head, said governing mechanism including a plurality of double-acting locators, each of said locators having a positioning point, and some of said positioning points being located different distances from the top and the bottom of certain locators than in certain others of said locators, and guides extending from a corresponding point on each locator and from both sides thereof to said positioning point, said locators being interchangeable, and when placed in any sequence forming a continuous track, by reason of the matching of the guides on each locator.

6. The combination with a computing head, of controlling mechanism for governing the state of said computing head as to addition or subtraction, and governing mechanism for said controlling mechanism, said governing mechanism comprising a revoluble locator, said locator acting positively on a revolving movement thereof to control said states of said computing head.

7. The combination with a plurality of computing heads, of individual controlling mechanism for governing the state of each of said computing heads, and governing mechanism for controlling said controlling mechanism, said governing mechanism comprising a revoluble shifter, for each computing head, each of said shifters including a plurality of locators, each of said locators being double-acting, so as to positively control the movement of said controlling mechanism in both directions, said plurality of locators controlling the governing mechanism successively by a revolving movement of said shifter.

8. The combination with a computing head, of controlling mechanism for governing the state of said computing head, and governing mechanism for controlling said controlling mechanism, said governing mechanism comprising a locator mounted on said holder, said locator having a groove on each side thereof; said grooves each being formed with a contracted portion and guiding portions converging toward the contracted portion, the contracted portion on opposite sides of said locator being located at different distances from the top thereof.

9. The combination with a computing head, of controlling mechanism governing the state of said computing head, a governing mechanism for controlling said controlling mechanism, said governing mechanism comprising a rotatable shaft, a holder mounted on said shaft, and locators mounted on said holder, each of said locators being differently formed on its opposite faces and acting on a rotation only of said shaft to control the state of said computing head according to whether said locator is in one position or in the reverse position.

10. In a computing machine having a computing head and mechanism for controlling the state of said computing head, the combination of a rotatable shaft, a holder mounted on said shaft, a plurality of pins extending from the holder in spaced relation from each other, and locators mounted on said pins, each of said locators being independently formed on its opposite faces, and acting on a rotation of said shaft to control the state of said computing head, according to whether one face or the opposite face is presented to the state-controlling mechanism.

11. In a computing machine having a computing head and mechanism for controlling the state of said head, the combination of a shaft, a holder secured to said shaft, a plurality of pins projecting therefrom, a series of locators loosely mounted on said pins, and a spring-pressed guard for holding said locators on said pins, said locators coöperating with said controlling mechanism to thereby determine the state of said computing head, said guard holding said locators in effective position during activity thereof, and movable to permit adjustment of said locators.

12. The combination with a computing head, of means for determining the state of said computing head, as to addition, subtraction or neutral, said means including a locator invertible to change the effective position to control one or another of said states, and reversible to change the control from either of said first two states to the third state.

13. The combination with a computing head, of a shifting lever for determining the state of said computing head, a pin on said lever, a shifter for manipulating said lever, and a manually rotatable shaft for supporting said shifter, said shifter embodying a plurality of locators having grooves with positioning points located at varying distances from the top of said shifter, so as to vary the position to which said pin and said lever may be manipulated by the actuation of said locators during the rotation of said shaft and to thereby determine successive states of said computing head as said shifter is rotated, said grooves being formed so as to positively determine the position of said pin.

14. The combination with a computing head, of controlling mechanism for said computing head arranged to govern the state of said computing head, and a shifter for said controlling mechanism acting to positively manipulate the same in either direction to one of three positions, said shifter having positioning points corresponding to said positions located at regular intervals one from the other, with spaces between said positioning points of sufficient magnitude to permit a free play of said controlling mechanism independent of said shifter.

15. The combination with a computing head, of controlling mechanism for governing the state of said computing head, and a shifter for said controlling mechanism, said shifter including a plurality of locators having effective positioning points intermediate their ends and ineffective spaces at their ends, said locators being abutted end to end, so as to afford an ineffective zone of sufficient magnitude to permit a free play of said controlling mechanism independent of said shifter.

16. The combination with a computing head, of controlling mechanism for governing the state of said computing head, said governing mechanism including a locator having a positioning point on one face thereof, located at different distances from the top and the bottom of said locator, and having on another face thereof a positioning point, located at an equal distance from the top and the bottom thereof, said points acting to differently control said governing mechanism according to which one is active.

17. The combination with a computing head, of controlling mechanism for said computing head, and a locator for determining the position of said controlling mechanism, said locator having a positioning point midway between its top and bottom ends on one side and another positioning point located at unequal distances from its top and bottom ends on the other side, so that said locator can be reversed to bring selectively, solely one of two different positioning points into possible effective coöperation with said controlling mechanism, said locator being also invertible so as to enable said unequally distant positioning point to coöperate with said controlling mechanism at different effective levels so as to afford different actions.

18. The combination with a computing head, of a controlling mechanism for governing the state of said computing head, and a shifter for said controlling mechanism, said shifter including a holder and a series of locators detachably mounted on said holder and having their side ends beveled in two directions to enable said locators to form a circular inclosure on said holder, either in one position or a reversed position.

19. The combination with a computing head capable of existing in addition, subtraction or a neutral state, of a shifter for controlling the state of said computing head, said shifter including a member having double-acting faces for positively controlling the state of said computing head on movement of said shifter in a single plane.

20. The combination with a computing head, of mechanism for controlling the state of said computing head, a revoluble shifter for actuating said controlling mechanism, said shifter including a series of locators having grooves therein with surfaces conforming to the surfaces of cylinders, said locators being arranged end to end in a circle, so that the cylindrical surface of one will be a continuation of the cylindrical surfaces of the others to form a substantially complete cylindrical surface, and means for revolving said shifter to control the state of the computing head by bringing said locators into action successively.

21. The combination with a computing head, of mechanism for controlling the state of said computing head, a revoluble shifter for actuating said controlling mechanism, said shifter including a holder and a series of locators detachably connected to said holder, so that their position can be changed, each of said locators having grooves on opposite sides to determine different positioning points, the bottoms of said grooves being formed by convex cylindrical surfaces, so that the several locators can be arranged in a circle, the outer convex surface of one forming a continuation of the outer convex surfaces of the others, to afford a complete cylindrical surface in any effective arrangement of said locators, the side ends of said locators being beveled in two directions, so as to enable the close juxtaposition of said locators in a circle in any effective arrangement of said locators, and means for revolving said shifter to control the state of said computing head in the successive positions thereof.

22. The combination with a computing head, of controlling mechanism for said computing head, and a locator for governing the action of said controlling mechanism, said locator being duplex and having two effective faces, only one of which is adapted to be in action at a time, said faces each having a positioning point, which positioning points are located at different distances from the top and bottom ends of the locator, so that said locator can be reversed to selectively bring one of the two positioning points into effective control over the controlling mechanism.

23. The combination with a computing head, of controlling mechanism for governing the state of said computing head, and a series of locators movable into individual engagement with said controlling mechanism, to govern the action thereof, said locators being arranged immediately adjacent one another to form a continuous series and acting on said controlling mechanism to change the state of the computing head in accordance with the position occupied by each locator.

24. The combination with a plurality of computing heads, of a carriage traveling to determine the activity of said computing heads, and governing mechanism for controlling the states of all of said computing heads, said governing mechanism being actuable manually back or forth to obtain any predetermined combination of states of said computing heads for any position of said carriage.

25. The combination with a computing head, of controlling mechanism for governing the state of said computing head, and a series of locators acting to positively adjust said controlling mechanism back and forth for different states of said computing head, said locators being placed end to end, so as to form in effect a composite shifting member effective by a simple movement in one plane to determine by each locator a state for said computing head independent of and which may be distinctive from the states determined by the adjoining locators.

26. The combination with a computing head, of controlling mechanism for governing the state of said computing head, and a series of locators for adjusting said controlling mechanism back and forth for different states of said computing head, said locators being placed end to end so as to form in effect a composite shifting member effective by a simple movement in one plane to determine by each locator a state for said computing head independent of and which may be distinctive from the states determined by the adjoining locators, said locators being interchangeable in their position in the series and mating immediately with the adjoining locators so as to be effective to shift to their accordant states irrespective of the states determined by the adjoining locators.

27. The combination with a computing head, of controlling mechanism for governing the state of said computing head, and a plurality of locators for shifting said controlling mechanism, said locators being arranged end to end in an endless series so as to form in effect a continuous composite member, each locator in the series controlling a predetermined state of the computing head, said locators being formed so that any one in the series may change places with any other in the series, and fit in with the adjoining locators, at the same time being effective to change said controlling mechanism and said computing head to its own state irrespective of the states determined by the adjoining locators in its own position.

28. The combination with a computing head, of a composite governing mechanism for said computing head, including a plurality of locators arranged in a circular series end to end so as to form in effect a continuous circular member, each of said locators being formed so as to determine a given state of said computing head, which may be different from that determined by the adjoining locators, and also so as to mate with any of the other locators of any other form determining any other state, whereby any locator can be positioned at any place in the circular series and come into play properly to determine its own state after a determination of the state of the computing head by one of the adjoining locators.

29. The combination with a computing head, of a composite governing mechanism for said computing head, including a plurality of locators arranged in a circular series end to end so as to form in effect a continuous circular member, each of said locators being formed so as to determine a given state of said computing head which may be different from that determined by the adjoining locators, and also so as to mate with any of the other locators of any other form determining any other state, whereby any locator can be positioned at any place in the circular series, and come into play properly to determine its own state after a determination of the state of the computing head by one of the adjoining locators, each of said locators also being double faced, having two effective sides only, one of which is normally active, said locators being reversible to bring into play the silent side, and render silent the effective side, and mating properly with the adjoining locators whether reversed or not.

30. The combination with a computing head arranged to compute different computing zones, of a rotary circular governing mechanism for controlling the states of said computing head in different computing zones, said governing mechanism being composite and comprising a series of locators arranged end to end in a circle so as to be practically continuous in effect during a rotation of the governing mechanism as a whole, said locators being of several forms corresponding to the several states of said computing head, and all being formed so as to mate with any other form of locators, whereby a different predetermined sequence of states may be had during successive step-by-step rotations of said governing mechanism by merely arranging said locators of various forms in a predetermined order.

31. The combination with a computing head, of controlling mechanism for determining the state of said computing head, and governing mechanism for adjusting said controlling mechanism, said governing mechanism having a position to adjust said controlling mechanism and being adapted to pass beyond said position, so as to leave said controlling mechanism free and independent of said governing mechanism.

WALTER WRIGHT.

Witnesses:
PAUL ZIRON,
LORENZ L. PRITZL.

Copies of this patent may be obtained for five cents each, by addressing the "Commissioner of Patents, Washington, D. C."